Patented Nov. 14, 1933

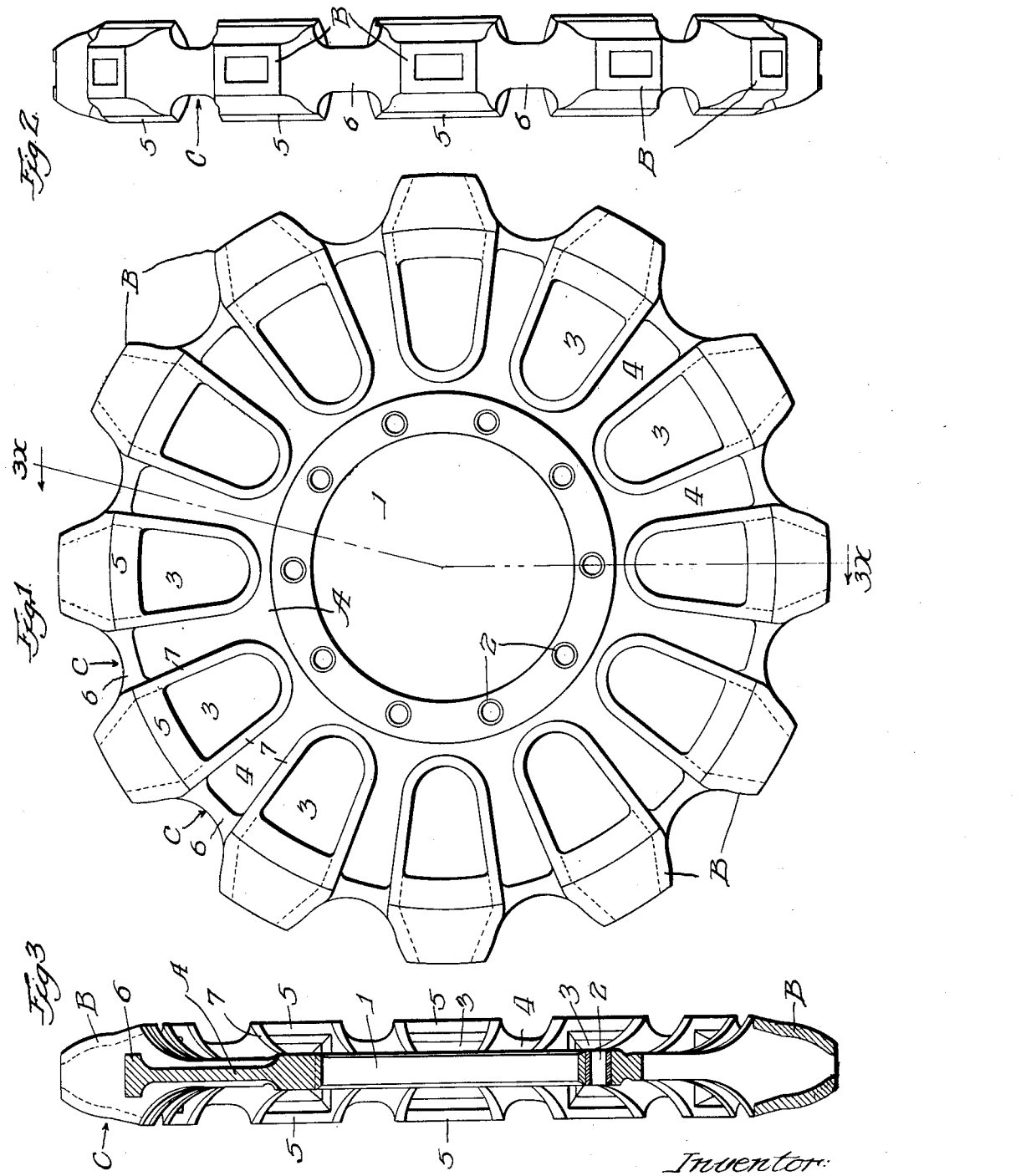

1,934,819

UNITED STATES PATENT OFFICE 1,934,819

HOLLOW TOOTH SPROCKET WHEEL

Claude Rorabeck, Chicago Heights, Ill.

Application November 2, 1929. Serial No. 404,220

4 Claims. (Cl. 74—31)

This invention relates to sprocket wheels to be employed with endless tread tractor units, excavating chains, and in other situations in which it is advantageous to have special means for evacuating mud or other material from spaces and surfaces where it is liable to obstruct proper cooperation between the sprocket and the member that travels upon it.

The invention proceeds upon the principle of making the teeth of such a sprocket wheel hollow and open at their outer and inner ends, so as to lessen the volume of earthy material that is displaced into the path of the link or other open member which the sprocket is designed to fit; recesses being formed in the body of the wheel in communication with the inner open bottoms of the teeth in forming the evacuation spaces for the teeth; also making the body of the wheel with escape channels for accumulating material radially inward from the inter-tooth spaces upon which the spools or other transverse parts of links or the like seat in the operation of the wheel. The preferred embodiment of the invention herein selected for purposes of illustration, from which the advantages of the invention may be realized to the fullest measure, is preferably made to embody certain additional features of construction, including the production of the body of the wheel in disk-like form with a circumferential series of interruptions, the outer portions of which are occupied by the teeth while the inner portions constitute the aforesaid evacuating spaces for the teeth, and the portions of the disk intervening between such interruptions standing as integral webs connecting the teeth and carrying the inter-tooth seats; also the enlargement of the outer ends of the spoke-like inter-tooth webs in a manner to offer increased support for the portion of the chain seating thereon; and the provision of integral bracket-like sustaining flanges outstanding from the plane of the wheel and extending inwardly from the overhanging walls of the hollow teeth and along the margins of the evacuating recesses, and incidentally defining unobstructed evacuation channels extending radially inward from the inter-tooth spaces and materially strengthening the disk-like body portion of the wheel.

In the accompanying drawing—

Figure 1 is a side elevation, partly in section, of a sprocket wheel in which the several features of the invention are embodied.

Figure 2 is an edge view of the same; and

Figure 3 is a section on the line 3x—3x of Figure 1.

A represents the body of the wheel, B the teeth which are intended to enter openings in the links or other members with which the sprocket is used, and C represents inter-tooth seats that receive the spools or other cross members of such links. The body A is disk-like in form, preferably with an inner annulus 1 of enlarged section suitably perforated as at 2 to adapt it to serve as a means of mounting the sprocket upon a hub, and with a circumferential series of interruptions or recesses 3 leaving spoke-like portions 4 between them. The outer areas of the interruptions 3 are occupied by teeth B which are designed as hollow truncated pyramids of bottomless box-like form, so that their interior spaces enlarge toward the center of the wheel and insure free passage for any material that enters their open outer ends; and these teeth communicate through their open inner ends with the inner portions of interruptions or recesses 3 in the body of the wheel, so that the latter serve as evacuating spaces for the teeth, or to at least avoid obstructing the inner discharge end of the teeth.

As will be best appreciated by an inspection of Figure 3, teeth B are of such thickness in the direction of the axis of the wheel that their side walls 5 overhang the disk-like body A to an extent which insures freedom of escape of material trapped within the teeth, independently of the evacuating spaces 3, so that said spaces 3 together with the overhanging areas of the discharge openings of the teeth, afford especially large discharge capacity.

Spoke-like projections 4 intervening between the interruptions 3 function as integral strengthening webs for the teeth B, and their outer ends provide the inter-tooth seats 3 already referred to; and to better adapt them to serve both these purposes, their said outer ends are enlarged, as shown at 6.

Extending inwardly from the overhanging walls 5 of the teeth B are integral bracket-like flanges 7, outstanding from the disk-like body A at gradually decreasing height, and extending integrally along the margins or contours of the recesses 3 in a manner to greatly stiffen the body member transversely while leaving unobstructed spaces between them as evacuating channels for material that would otherwise accumulate on the seats C; each channel being defined by the spoke-like web extension 4 and the two adjacent flanges 7; and the inward decrease in dimension of flanges 7 perpendicular to the disk-like body A insuring free discharge of material working inward through said channels.

I claim:

1. In a sprocket wheel, a circumferentially arranged series of symmetrically formed hollow, open-top and open-bottom, box-like teeth, with radially inwardly diverging opposite walls providing inwardly enlarging mud channels extending through the teeth, and a body having spoke-like extensions of lesser thickness than and related as webs between and integrally uniting said teeth; the spaces between said spoke-like extensions being radially aligned with the channels of the teeth and providing escape for material flowing through the teeth.

2. In a sprocket wheel, a circumferentially arranged series of symmetrically formed hollow, open top and open-bottom, box-like teeth, with radially inwardly diverging opposite walls providing inwardly enlarging mud passing channels through the teeth, and a body having spoke-like extensions of lesser transverse dimension than the teeth and beyond the plane of which the teeth extend in the direction of the axis of the wheel; said spoke-like extensions being related as webs between and integrally uniting said teeth; said webs having reinforcing flanges outstanding from the plane of the body and extending to and integrally united with overhanging portions of the teeth.

3. In a sprocket wheel, a circumferentially arranged series of symmetrically formed hollow, open-top and open-bottom, box-like teeth, with radially inwardly diverging opposite walls providing inwardly enlarging mud passing channels through the teeth, and a body having spoke-like extensions related as webs between and integrally uniting said teeth; said spoke-like extensions having reinforcing enlargements located in circumferential alignment with and extending to and integral with the tooth walls at the greatest circumferential dimension of the teeth and constituting inter-tooth seats.

4. A sprocket wheel, comprising a circumferential series of radial spoke-like projections leaving between them mud-evacuating spaces extending entirely through the wheel in the direction of its axis; and a circumferential series of box-like chain-receiving teeth integrally united to the outer ends of said projections; said teeth being hollow and open at their inner and outer ends to permit flow of mud radially through the teeth and into the inter-spoke spaces; said teeth being of materially greater dimension than the spokes in the direction of the axis of the wheel, so that channels for the escape of mud are left between the teeth on opposite faces of the spokes; said spokes having stiffening flanges conforming substantially to their outlines, constituting confines of said channels; and said flanges extending to and integrally united with the teeth and assuming the relation of supporting brackets to the teeth but decreasing in depth inwardly to facilitate escape of material from the said spaces.

CLAUDE RORABECK.